(No Model.) 2 Sheets—Sheet 2.
G. R. PEARE.
HORN HEATING DEVICE FOR WAX THREAD SEWING MACHINES.
No. 405,594. Patented June 18, 1889.
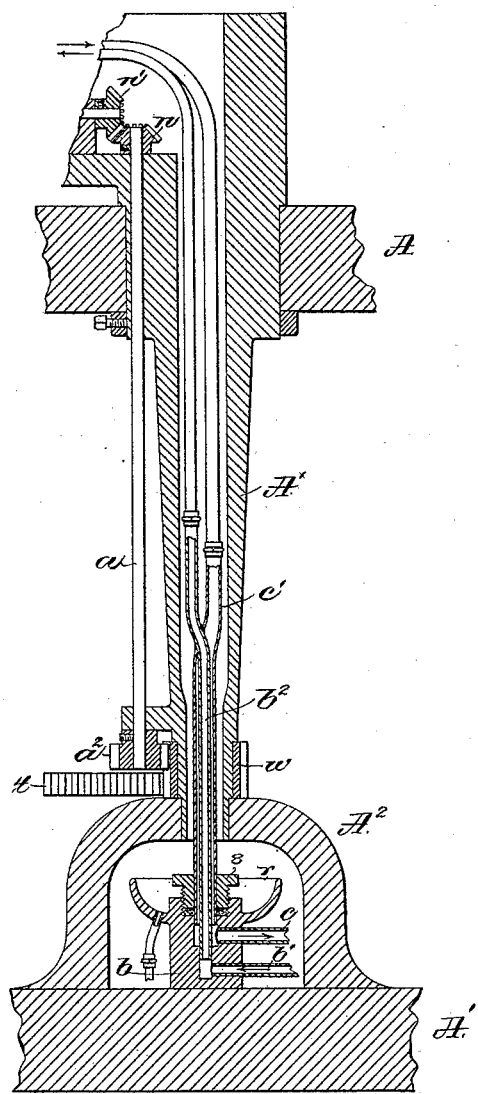

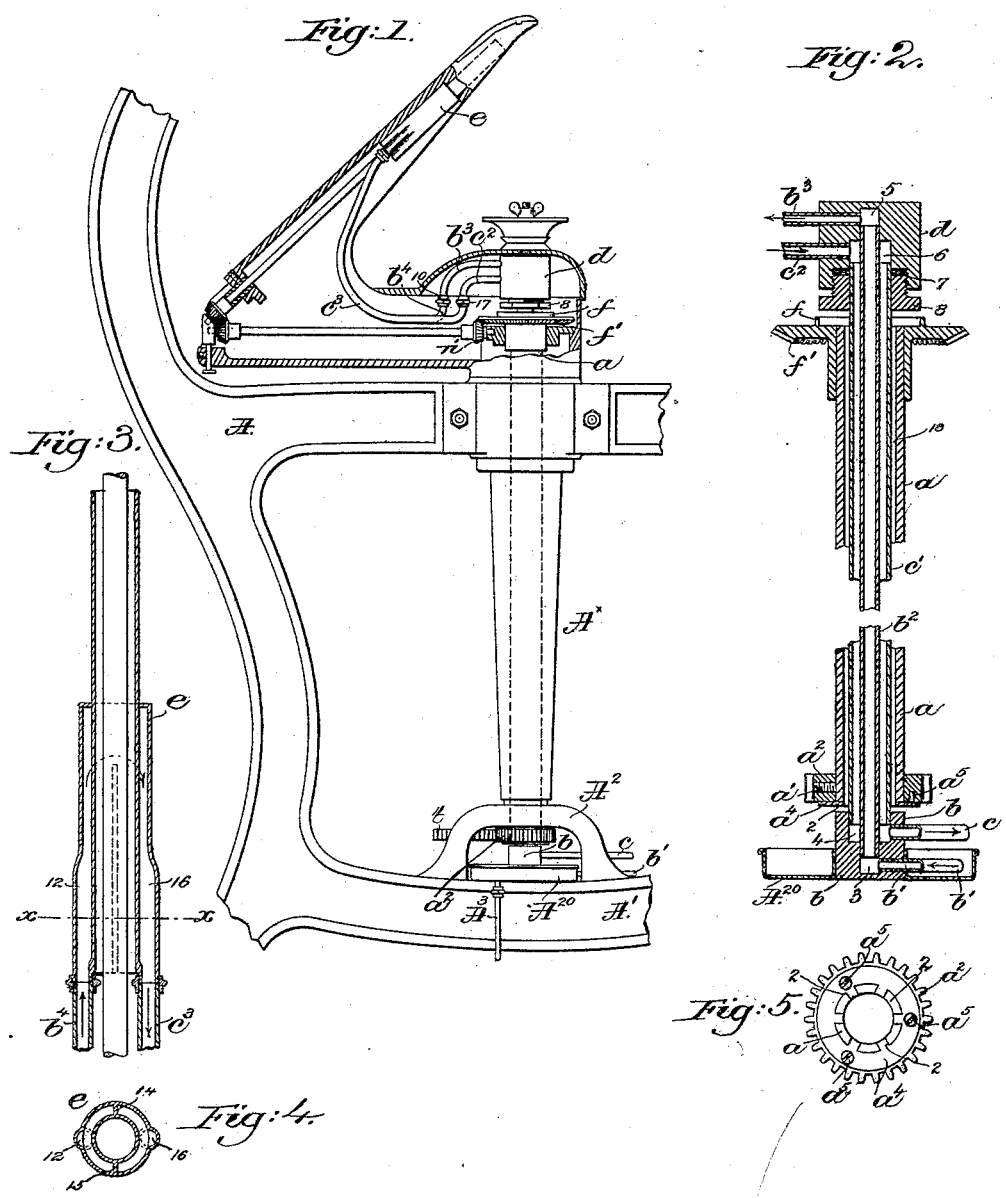

UNITED STATES PATENT OFFICE.

GEORGE R. PEARE, OF LYNN, ASSIGNOR OF ONE-HALF TO EDWIN L. SPRAGUE, OF BOSTON, MASSACHUSETTS.

HORN-HEATING DEVICE FOR WAX-THREAD SEWING-MACHINES.

SPECIFICATION forming part of Letters Patent No. 405,594, dated June 18, 1889.

Application filed December 18, 1888. Serial No. 293,941. (No model.)

*To all whom it may concern:*

Be it known that I, GEORGE R. PEARE, of Lynn, county of Essex, State of Massachusetts, have invented an Improvement in Horn-Heating Mechanism for Wax-Thread Sewing-Machines, of which the following description, in connection with the accompanying drawings, is a specification, like letters on the drawings representing like parts.

This invention has for its object to improve that class of wax-thread sewing-machines using a horn, and well known as the "McKay." For the successful operation of a machine of this class the thread should be coated with wax, rather than oil; but great difficulty is experienced in the use of wax because of the wax becoming too cool on the thread before the stitch is fully completed, and therefore it becomes a great desideratum to provide the horn with simple and efficient means whereby it may be properly heated to keep the wax on the thread at the proper consistency, and so, also, the construction of the parts should be such that when steam is used the water of condensation will not escape upon the floor or upon the work.

In accordance with my invention I have extended through the hollow shank of the horn and in the line of the center of rotation thereof steam-pipes, which lead the steam by other pipes into the arm of the horn to keep the same heated to the required degree.

In the accompanying drawings I have shown two forms of my invention as embodied in connection with the horn of a so-called "McKay" sewing-machine, substantially such as represented in United States Patent No. 45,422, dated December 13, 1864.

My invention consists, essentially, in the combination, with the hollow shank of a horn, of a system of steam-pipes arranged in the line of the center of rotation of the horn and extended into an arm of the horn, whereby the horn may be heated by steam and yet permit the horn to be revolved freely, substantially as will be described; also in a rotating horn having a hollow shank, combined with a hollow shaft and with a system of pipes extended through the said hollow shaft and having extensions to lead the heating medium into an arm of the horn and conduct it therefrom back through the said shaft, substantially as will be described.

Other features of my invention will be pointed out in the claims at the end of this specification.

Figure 1, in front elevation and partial section, shows a sufficient portion of a horn and the frame-work in which it rotates to enable my invention to be understood. Fig. 2 is an enlarged vertical sectional detail taken through the hollow shaft of the horn to show the parts within it, the said figure showing a part of the horn in section. Fig. 3 is an enlarged detail of a radiator, which is located in the arm of the horn. Fig. 4 is a section of Fig. 3 in the line $x$. Fig. 5 is a detail to be referred to, and Fig. 6 a modified form of my invention.

The frame-work A of the horn is and may be of usual shape, the shape shown being that common to the McKay machine.

In practice the horn carries at its upper end or tip a whirl, which is rotated by gearing and shafts in usual manner.

The horn-shank $A^*$, made hollow, has a bearing in the frame-work, and the lower end of the said shank rests on a step $A^2$ in usual manner. The shaft $a$, extended through the horn-shank and having the gear $f'$, co-operating with the usual gears and shafts to actuate the usual whirl, instead of being a solid shaft, as usual, is made hollow, as best shown in Fig. 2, and at its lower end has secured to it by screw $a'$ the usual gear $a^2$. To attach this gear more securely than would be possible by the employment of only the screw $a'$, I have provided the lower end of the shaft with projections, as 2, which are made to enter notches of a ring $a^4$, (shown as attached to the lower side of the gear $a^2$ by screws $a^5$,) the said ring being shown separately in Fig. 5.

The cross-piece (marked $A'$) of the frame-work receives upon it a drip-pan $A^{20}$, provided with a pipe $A^3$, which may be led to any trap or sewer. The cross-piece $A'$ also supports a step $b$, shown as bored to leave chambers, as 3 4, of different size, the chamber 3 having in communication with it an inlet or steam pipe $b'$, while the chamber 4 has communicating with it an outlet or waste-steam pipe $c$. The chamber 3 receives a pipe $b^2$, which is extended up through the hollow shaft $a$ and receives upon it at its upper end (see Figs. 1 and 2) a block $d$, the said pipe $b^2$ entering a chamber 5, but with a moving fit, for in practice the block $d$ is connected to and rotates in unison with the horn about the upper end of the pipe $b^2$, the fit being such as to substantially prevent the escape of steam and water. The block $d$ has a chamber 6 of greater diameter than the chamber 5, and the pipe $c'$, surrounding the pipe $b^2$ and extended through the hollow shaft $a$, has one of its ends entered into the chamber 4 snugly, while its upper end enters the chamber 6 not so snugly.

To prevent the escape of water from between the pipe $c'$ and the block $d$, I have provided the latter with a packing, as 7, which is held in place by a nut or gland 8.

Leading from the chamber 5 is the pipe $b^3$, forming also a part of the inlet-pipe, it being joined by a suitable union, as 10, to a pipe $b^4$, forming a continuation of the said inlet-pipe, the said pipe $b^4$ being made to communicate with the leg 12 of the radiator $e$, placed in the horn, the said radiator having two partitions 14 15, which terminate short of the upper end of the radiator, so that the steam entering the leg 12 passes over the upper ends of the said partition and descends down along the leg 16 of the radiator and into the pipe $c^3$, which represents the upper end of the return-pipe, the said pipe $c^3$ being joined by a suitable coupling 17 to the pipe $c^2$, which enters the chamber 6, the return steam from the chamber thus passing along down within the pipe $c'$ and out through the pipe $c^2$ to a suitable trap or sewer. In this way it will be noticed that the steam permitted to enter the pipe $b'$ has a free circulation up through the hollow shaft $a$ and then into the radiator $e$ and back down through the said hollow shaft, where it is permitted to escape, as described.

Any water of condensation escaping from the block $d$ enters the drip-cup $f$ at the upper side of the usual gear $f'$, attached to the shaft $a$, the said water of condensation passing down through the said shaft in the passage-way 18, between the pipe $c'$ and the inner side of the hollow shaft $a$, the said water of condensation passing out of the lower end of the shaft into the drip-cup $A^{20}$ and out, as stated.

Prior to my invention I am not aware that the shaft $a$ has been made hollow, or that a steam-pipe has ever been led up through it, so I do not desire to limit my invention to the exact shape of the inlet or outlet pipes for the steam or heating medium.

I have shown the horn as provided with a radiator, into and through which the pipes lead the heating medium; but the pipes $b^4$ and $c^3$ might be brought directly together without departing from my invention; but by the use of the radiator it is possible to convey the steam farther into the smaller upper end of the horn than would be practically possible by joining the ends of the pipes $b^4$ and $c^3$ directly together.

The vertical shaft, to which is attached the gear $f'$, derives its rotary reciprocating movement from the segmental rack $t$, common to the McKay machine, and to the said patent.

Referring to Fig. 6, it will be seen that the horn-shaft $a$, having the gear $a^2$ at its lower end, is placed outside the shank of the horn and enters a groove in the said shank where the latter extends through the bearing or frame-work A. To enable me to operate the said shaft $a$ in this latter position, I have mounted a gear $w$ loosely upon the lower end of the horn-shank, just above the yoke or step $A^2$, and have made the said gear wide enough to be engaged by the usual segmental rack $t$, common to the McKay machine, and also to be engaged by the gear $a^2$. In this modification the step $b$ is provided with a drip-cup $r$ and a gland 8, and the shafts $b'$ and $c$ each turn in the step, and the inlet-pipe $b^2$ for a part of its length is extended through the outlet-pipe $c'$, both the said pipes leading from the upper end of the shank of the horn to the radiator, as in Fig. 1.

The shaft $a$ in Fig. 6 has a small bevel-gear $n$, which engages the bevel-gear $n'$ and rotates the shaft for moving the usual whirl.

In other applications filed by me—viz., Serial No. 271,667, filed April 24, 1888, and Serial No. 285,021, filed September 10, 1888—I have shown a horn adapted to be heated by steam-pipes located outside the horn-shank, the latter being grooved externally, the bearings for the shank of the horn having certain beveled bearings whereby the steam could pass readily through the same; and I have also shown the tension and waxing devices as mounted upon a plate adapted to be turned about a vertical plate; so I do not herein claim any of the features contained in the said applications, for in this present invention the claims are confined to construction wherein the shank of the horn is adapted to receive a hollow shaft through which is extended the steam-pipes employed to heat the horn, as set forth in the claims.

I claim—

1. The combination, with the hollow shank of a horn, of a system of steam-pipes arranged in the line of the center of rotation of the horn and extended into the arm of the horn, whereby the horn may be heated by steam and yet permit the horn to be revolved freely, substantially as described.

2. The rotating horn having a hollow shank, combined with a hollow shaft, as $a$, and with a system of pipes extended through the said hollow shaft, and having extensions to lead the heating medium into the arm of the horn and conduct it therefrom back through the said shaft, substantially as described.

3. The combination, with the horn and its hollow shaft $a$, and its gear $a^2$ and screw $a'$ to secure it, of the ring $a^4$, having a notch to engage a projection from the said shaft, and with means to secure the ring to the gear, substantially as described.

In testimony whereof I have signed my name to this specification in the presence of two subscribing witnesses.

GEO. R. PEARE.

Witnesses:
G. W. GREGORY,
B. DEWAR.